United States Patent Office 2,867,591
Patented Jan. 6, 1959

2,867,591

AIR DRYING WRINKLE COATING COMPOSITION CONTAINING EPOXY RESIN ESTERS

Burton E. Lederman, Dayton, Ohio, assignor to Midland Chemical Corporation, Dayton, Ohio, a corporation of Delaware No Drawing. Application January 12, 1954
Serial No. 403,628

6 Claims. (Cl. 260—18)

This invention relates to coating compositions and more particularly to epoxy resinous ester compositions which form useful wrinkle-drying varnishes and enamels.

Epoxy resins are condensation polymers of bisphenol and epichlorhydrin. The proportions of the reactants are controlled so that the end groups are epoxides. Epoxy condensation polymers have the typical chemical structure as follows:

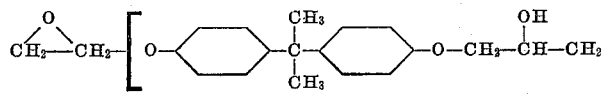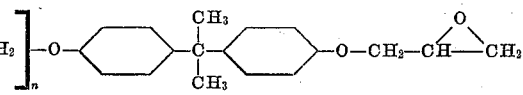

wherein $n$ represents the extent of polymerization, being an integer preferably 1 to 10.

The length of the chain (the value of $n$) can be made to vary by changing the molecular proportions of epichlorhydrin to dihydric phenol in preparing the epoxy ether. Thus, by decreasing the mols of epichlorhydrin per mol of dihydric phenol from about 2 downwards toward 1 the molecular weight, the softening point and the epoxy equivalency are increased. In general, these glycidyl ethers having epoxy equivalency between 1 and 2 contain terminal 1,2 epoxy groups and have alternate aliphatic and aromatic groups linked together by ethereal oxygen atoms.

It is an object of the present invention to provide wrinkle-drying coating compositions, which when applied to surfaces, harden at normal room temperatures.

Another object is to provide wrinkle-drying coating compositions containing epoxy resins.

Still another object of the invention is to provide coating compositions having improved drying characteristics, and which compositions comprise epoxy resins having incorporated therewith a plurality of drying or curing accelerators or catalyst.

A further object is the provision of a composition comprising a vehicle for use in pigmented or non-pigmented coating compositions which vehicle consists essentially of a film-forming epoxy resin modified with fatty acids and/or drying and semi-drying oils. The drying oils and fatty acids preferably are of the conjugated double-bond type, but other fatty oils of the drying and semi-drying type or suitable mixtures thereof may be used.

Other objects and advantages of the invention will become apparent from the following description.

In accordance with the invention, epoxy resins, examples of which are known as Epons, are partially esterified with drying oil fatty acids, e. g., tung oil or oiticica oil, or other wrinkling oil fatty acids. The resultant product, after addition of suitable thinners and metal driers, is mixed with amines, preferably polyfunctional amine catalysts to provide a pre-spray mix, to effect polymerization of the remaining unesterified alcohol groups of the epoxy resin to produce a tough film having a wrinkle texture at normal room temperatures (70–74° F.) or under forced air-drying conditions. If desired, the epoxy resin ester and polyfunctional amine may be applied as a dual or blended spray mixture.

The esterified wrinkling oil fatty acids of epoxy resins with or without the presence of raw, heated bodied or blown wrinkling oils together with metal driers, e. g., cobalt naphthenate, manganese resinate, etc., and amine provide simultaneous wrinkling and drying or curing of the epoxy ester composition, the wrinkling and condensation of the resin taking place concurrently at room temperature. By varying the proportionate amounts of the constituents the wrinkle texture may be controlled as desired.

In general, epoxy resins suitable for use in compounding the air-drying wrinkle compositions of the invention comprise polymeric polyether-polyhydric phenols, containing from 2 to 25 or more, and desirably between about 5 and 10 hydroxl groups. The epoxy resin is partially esterified with drying oil fatty acids such that approximately 35% of the hydroxyl groups of the alcohol are esterified with the drying oil fatty acids.

Epoxy resins which are suitable for use in making the compositions of the invention are the resins marketed by The Shell Chemical Corporation under the trade names "Epon" 1001, 1004, 1007 and "Epon" 1009, and which are described in their Technical Bulletin SC: 50–40 (1950). Epon resins 1001 and 1004 are particularly useful in preparing the compositions of this invention.

Wrinkle-drying varnishes, enamels, and final sprayable compositions are suitably thinned with solvents and solvent mixtures to provide a product of the desired consistency for application. For this purpose a ketone or ester such as commonly used in cellulose lacquers and including acetone, methylethyl ketone, methyl isobutyl ketone, Cellosolve, butyl acetate, amyl acetate, etc. or mixtures thereof may be utilized. These solvents may be used in combination with, or diluted with, minor amounts of aromatic hydrocarbon solvents such as toluol, xylol and VMP naphtha and mixtures thereof.

As suitable metal drier catalysts, cobalt naphthenate or linoleate cobalt acetate, lead acetate and mixtures of these are useful. For fast air-drying, a drier concentration of 0.04% cobalt and 0.2% lead in the compositions is preferred. The metal compound may be suitably incorporated in the solvent thinner such as xylol, toluol and light petroleum solvent naphtha and added to the epoxy resin and oil constituents.

The amine reactant or catalyst used to cure the epoxy resin preferably comprises various polyfunctional amines containing active hydrogen or hydroxyl groups. Aliphatic polyamines are especially applicable, such as diethylene triamine, tri-ethylene tetramine. These polyethene polyamines react with the resin to form tough adherent films and the accentuated drying by the combination of metal driers and amine catalysts produce the desired wrinkle texture. For example, one mol of diethylene triamine may be reacted with one mol of the long chain organic acid to produce a final complex amino esterified product.

In general the proportions of amine and polyepoxide fatty acid ester are such as to insure reaction of epoxide groups with amine groups, that is the polyepoxide should be in excess of that equivalent to the polyhydric phenol and that equivalent to the amine. The final reaction product will thus contain long-chain polyepoxides reacted with polyhydric phenols and fatty acids and the amines in a complex reaction product or mixture. The reaction of alcoholic hydroxyls with epoxide groups may take place during the final hardening or polymerization.

It is possible by varying the proportionate amount of constituents to produce compositions of different types and properties. It is believed that the epoxy groups are initially reacted. Then the available hydroxyl groups react with the polyamine to form the final solid cured film upon admixing the fatty acid epoxy ester with the amine and air drying or forced air drying.

The following examples of air-drying wrinkle compositions may be considered as exemplary of the invention:

*Example I*

A vehicle for the air-drying wrinkle compositions is prepared as follows, the parts being by weight:

50 parts of polymeric condensation product of bisphenol and epichlorhydrin (Epon 1001 Shell Chemical Corporation) and 60 parts tung oil fatty acids are introduced into a kettle equipped with a mechanical stirrer and heating means. The mixture is heated to 480° F. for approximately five hours until the esterification reaction is completed. The resulting ester is then cooled to 350° F. and 5 parts cobalt naphthenate added, after which the mixture is thinned to 50% solids with a solvent consisting of xylol 50% and methyl isobutyl carbinol 50%. To the resultant mixture was added 15 parts of diethylene triamine to form a sprayable air-drying wrinkle composition.

*Example II*

One hundred parts of a polymeric condensate of bisphenol and epichlorhydrin (Epon 1007 Shell Chemical Corporation) and 60 parts of oiticica oil fatty acids are heated to 480° F. with stirring. The mixture is held at this temperature for one-half hour and then cooled to 375° F., and 4 parts of cobalt naphthenate and 6 parts of lead acetate. The mixture is then thinned 50% solids by the addition of 50% xylol and 50% methyl isobutyl ketone. Prior to spray application the 20 parts of triethylene tetramine is added to react therewith and accelerate the formation of a hard wrinkle texture film upon air-drying.

*Example III*

One hundred parts of a polymeric condensate of bisphenol and epichlorhydrin (Epon 1004 Shell Chemical Corporation), 40 parts linseed oil fatty acids, 35 parts tung oil fatty acids, and 20 parts rosin are heated to 380° F. There is then added 8 parts of phthalic acid anhydride to the heated mass and the temperature held at 480° F. for one hour. The mass is then cooled to 350° F. and 5 parts cobalt naphthenate and 7 parts lead acetate introduced. To thin the resinous complex to approximately 50% solids there is added 190 parts xylol and 120 parts Cellosolve acetate.

To produce an infusible film the resinous complex is sprayed onto the surface to be coated simultaneously with the spray application of tris-(hydroxyl methyl)-aminomethane catalyst as a 25% dispersion of the amine in xylol. The coating film (approximately 0.002 to 0.004 inch thickness) air dries (72° F.) to a wrinkle finish. A similar film may, if desired, be force dried at 200° F. for one-half hour.

*Example IV*

The vehicle of Examples I, II and III is pigmented to provide an enamel by introducing a pigmented paste utilizing the resinous complex vehicle as a base and dispersing pigment therein. Approximately 6 parts of pigment, e. g., chrome green, may be used per 100 parts of vehicle, the mass being ground together in a ball mill to thoroughly disperse the pigment.

Other pigments or mixtures such as carbon black, iron oxide, etc., may be used in place of chrome green to produce a desired color enamel.

*Example V*

Example III is repeated utilizing a mixture comprising "Epon" 1004 resin 100 parts; phenolic resin (Bakelite) 30 parts; tung oil 40 parts; and soya bean oil fatty acids 30 parts. The Epon resin and soya fatty acids are heated to 540° F. to form the ester and then the phenolic resin and tung oil is added and the mixture heated at 480° F. for two hours. After incorporating 0.04% cobalt naphthenate and 0.2 lead acetate, the mass is thinned to approximately 50% solids with 50:50 xylol and methyl isobutyl ketone and spray or brush applied with a 20% solution of diethylene triamine in xylol to produce an air-dry wrinkle coating film.

*Example VI*

The composition of Example I is repeated with the difference that one-half of the tung oil fatty acids is replaced by linseed oil fatty acids. This produces a composition which is slower drying than Example I composition but the film is tough and possesses good adhesion to metal surfaces.

*Example VII*

The composition of Example I is repeated but using tall oil fatty acids in place of one-half of the tung oil acids. Utilizing the drier and amine curing agent varnishes having improved drying characteristics are obtained.

In preparing the epoxy fatty acid complexes, esters prepared from acids containing conjugated double bonds are more active and improve the drying characteristics of the composition. The conjugated double-bond oil fatty acids are also more sensitive to heat polymerization during heat esterification than are those prepared from acids containing only isolated double bonds.

In the examples given, dehydrated castor oil acids, especially that containing about 40% conjugated double bonds (unsaturation) may be substituted for all or part of the drying oil fatty acids.

The epoxy-resinous ester compositions containing driers may be used directly as varnishes for application by spraying, brushing or flowing, or employed as a vehicle for pigmented compositions such as paints and enamels. Likewise, by adjusting the driers and amine addition the compositions may be converted to baking varnishes and enamels, e. g., capable of being converted to insoluble films by air oxidation and heat polymerization by heating at 250–300° F. for one hour.

Preferably, in preparing the epoxy eleoresinous compositions of the invention, only drying oils and their fatty acids containing conjugated double bond are used, such as tung oil, oiticica oil, hydrated castor oil or equivalent oils or mixtures thereof with drying oils with linseed oil. The use of substantial amounts of semi-drying and non-drying oils or their acids do not produce quick drying compositions and one which will wrinkle satisfactorily. Tung oil fatty acids are found most effective for producing good wrinkle texture; however, the heating time and temperature must be carefully watched to avoid bringing about gelation.

While the compositions comprising the film-forming polymeric polyether-polyhydric phenol esters are primarily adapted to provide a product which may be applied as a single spray or brush coating, the composition, if desired, may be applied to a surface which has been provided with a base coating.

Modifications may be made in practicing the invention and the compositions modified by the use of different solvents, pigments and epoxy resins. Accordingly, it is not intended to have the invention limited to or circumscribed by the specific details of procedure, materials, proportions hereinabove set forth by way of examples in view of the fact that the invention is susceptible to modifications according to individual preference or con-

What is claimed is:

1. The process of preparing a coating composition adapted to be applied to a surface and dried to a wrinkle finish, said process comprising mixing, in parts by weight, 50 parts polymeric condensation product of bis-phenol and epichlorhydrin having a 1,2 epoxy equivalency between 1 and 2, and 60 parts tung oil fatty acid, heating the mixture to a temperature of approximately 480° F. until esterification is completed; adding to the resulting ester 5 parts cobalt naphthenate dissolved in a mixture of xylol and methyl isobutyl carbinol, and 15 parts diethylene triamine to form an air drying wrinkle composition.

2. The product of the process set forth in claim 1.

3. The process of preparing a coating composition adapted to be applied to a surface and dried to a wrinkle finish, said process comprising mixing, in parts by weight, 100 parts polymeric condensate of bisphenol and epichlorhydrin having a 1,2 epoxy equivalency between 1 and 2, and 60 parts oiticica oil fatty acid, heating the mixture to a temperature of approximately 480° F. until esterification is completed, adding to the resultant ester 4 parts of cobalt naphthenate and 6 parts of lead acetate and thinning the resultant mass with a mixture of xylol and methyl isobutyl ketone, and adding to the resultant mixture 20 parts of triethylene tetramine to form an air drying wrinkle composition.

4. The product of the process set forth in claim 3.

5. The process of preparing a coating composition adapted to be applied to a surface and dried to a wrinkle finish, said process comprising mixing, in parts by weight, 50 to 100 parts polymeric condensation product of bis-phenol and epichlorhydrin having a 1,2 epoxy equivalency between 1 and 2, and 30 to 75 parts drying oil fatty acid, heating the mixture to a temperature of 380 to 540° F. until esterification is completed, thinning the resultant resinous mass with xylol thinner to provide a resinous vehicle having 50% solids content, introducing pigment in the amount approximating about 6 parts pigment to 100 parts of said resinous vehicle, 5 to 7 parts oil soluble metal drier, and adding thereto 15 to 20 parts of a polyalkylene polyamine to accelerate the drying of the coating composition to a hard wrinkle film.

6. The product of the process set forth in claim 5.

References Cited in the file of this patent

UNITED STATES PATENTS

| | | |
|---|---|---|
| 2,392,346 | Waldie | Jan. 8, 1946 |
| 2,627,471 | Dowd | Feb. 3, 1953 |
| 2,665,266 | Wasserman | Jan. 5, 1954 |
| 2,683,668 | Godshalk | July 13, 1954 |
| 2,742,448 | Beacham et al. | Apr. 17, 1956 |

OTHER REFERENCES

Shell, Paint Oil and Chem. Review, November 9, 1950, pp. 15–18, 48 and 49.

Official Digest, July 1952, pp. 491–503.